(12) United States Patent
Wuthnow et al.

(10) Patent No.: US 9,368,120 B2
(45) Date of Patent: *Jun. 14, 2016

(54) METHODS AND SYSTEMS FOR CONTROLLING CALLING PARTY ACCESS TO CALLED DEVICE

(71) Applicant: AT&T Mobility II LLC, Atlanta, GA (US)

(72) Inventors: Mark Wuthnow, Austin, TX (US); Matthew Wayne Stafford, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,419

(22) Filed: Oct. 14, 2014

(65) Prior Publication Data

US 2015/0030142 A1    Jan. 29, 2015

Related U.S. Application Data

(62) Division of application No. 11/549,009, filed on Oct. 12, 2006, now Pat. No. 8,861,688.

(51) Int. Cl.
*H04M 1/64* (2006.01)
*G10L 17/24* (2013.01)
(Continued)

(52) U.S. Cl.
CPC ............... *G10L 17/24* (2013.01); *H04M 3/385* (2013.01); *H04M 3/42051* (2013.01); *H04M 3/4936* (2013.01); *H04M 7/0078* (2013.01); *H04L 65/1016* (2013.01); *H04L 65/1069* (2013.01)

(58) Field of Classification Search
CPC ..... H04M 3/38; H04M 3/385; H04M 3/2281; H04M 3/382; H04M 3/436; H04M 2201/18; H04M 2203/6054; H04M 3/42059; H04M 2203/6045; H04M 3/04936; H04M 2250/74; H04M 1/271; H04M 1/6505; H04M 1/665; H04M 7/0078; H04M 2242/22; H04M 2201/40; H04M 3/42102; H04M 2201/41; H04M 3/42; H04M 3/387; H04M 3/42093; H04M 3/4936; H04M 2201/406; H04M 3/4938; H04M 3/42204; H04M 3/44; H04M 3/493; H04M 3/42051; G10L 17/005; G10L 17/00; G10L 17/26
USPC ............ 379/49, 51, 88.02–88.21, 93.03, 118, 379/120, 183, 207.13–207.15, 245, 88.01, 379/88.02–88.24, 93.04, 127.02, 127.06, 379/142.01–142.06, 164, 179, 242, 252, 379/373.01–374.03, 387.01
See application file for complete search history.

(56) References Cited

U.S. PATENT DOCUMENTS 6,233,318 B1 *  5/2001  Picard ................. H04L 12/5835
                                                       379/88.12
6,246,988 B1 *  6/2001  Schier ........................... 704/273
(Continued)

FOREIGN PATENT DOCUMENTS

EP       1592216       11/2005
EP       1662767       5/2006

OTHER PUBLICATIONS

International Search Report and Written Opinion dated Jul. 31, 2008 in International Application No. PCT/US2007/081229.

(Continued)

*Primary Examiner* — Akelaw Teshale
(74) *Attorney, Agent, or Firm* — Hartman & Citrin LLC

(57) ABSTRACT

Devices, systems, and methods are provided to send an alert to a called party communications device during a call setup phase and to present the alert to a called party during an alert portion of the call setup phase. Other devices, systems, and methods are provided that allow a calling party to remotely and securely access at least one host computer by sending a security phrase during a call setup phase and presenting the security phrase to the host computer to determine if by way of comparison to a voice print if the calling party is a valid user.

20 Claims, 9 Drawing Sheets

(51) Int. Cl.
*H04M 3/38* (2006.01)
*H04M 3/42* (2006.01)
*H04M 7/00* (2006.01)
*H04M 3/493* (2006.01)
*H04L 29/06* (2006.01)

(56) References Cited

U.S. PATENT DOCUMENTS

| | | | |
|---|---|---|---|
| 6,263,363 | B1 | 7/2001 | Rosenblatt et al. |
| 7,756,979 | B1* | 7/2010 | Staack .................... H04L 51/14 |
| | | | 709/204 |
| 2002/0080927 | A1 | 6/2002 | Uppaluru |
| 2003/0142653 | A1 | 7/2003 | Jiang et al. |
| 2004/0054935 | A1* | 3/2004 | Holvey ................. G06Q 50/22 |
| | | | 726/27 |
| 2004/0223605 | A1 | 11/2004 | Donnelly |
| 2005/0132235 | A1* | 6/2005 | Teunen ......................... 713/202 |
| 2006/0045072 | A1 | 3/2006 | Chevrier et al. |
| 2006/0215827 | A1 | 9/2006 | Pfleging et al. |
| 2006/0215829 | A1 | 9/2006 | Schwartz |
| 2007/0041545 | A1* | 2/2007 | Gainsboro .................... 379/188 |
| 2007/0268908 | A1 | 11/2007 | Linkola et al. |
| 2010/0304704 | A1* | 12/2010 | Najafi .................... H01Q 1/242 |
| | | | 455/404.1 |

OTHER PUBLICATIONS

U.S. Office Action dated Apr. 12, 2010 in U.S. Appl. No. 11/549,009.
U.S. Office Action dated Sep. 29, 2010 in U.S. Appl. No. 11/549,009.
U.S. Office Action dated Jan. 20, 2011 in U.S. Appl. No. 11/549,009.
U.S. Office Action dated Jul. 6, 2011 in U.S. Appl. No. 11/549,009.
U.S. Notice of Allowance dated Jun. 12, 2014 in U.S. Appl. No. 11/549,009.

* cited by examiner

METHODS AND SYSTEMS FOR CONTROLLING CALLING PARTY ACCESS TO CALLED DEVICE

CROSS REFERENCE TO RELATED APPLICATION

This application is a division of U.S. patent application Ser. No. 11/549,009, now U.S. Pat. No. 8,861,688, filed Oct. 12, 2006.

TECHNICAL FIELD

The present invention relates generally to telecommunications and, more particularly, to devices, systems, and methods for sending a calling party alert to a called party in a communications network.

BACKGROUND OF THE INVENTION

Alerting tones, also known as ringtones, are used to inform a called party of an incoming call. Today, specialized and customized alerting tones can be played to the called party when a call is received. Further, the called party can have the option to vary the alerting tone based upon the calling party. In addition, some wireless service subscribers have deployed services that allow the calling party to hear a ringback tone, which is selected by the called party and played to the calling party during call ringing.

However, no service is provided today which permits the calling party to have any control over what the called party hears when the calling party calls. Thus, a heretofore unaddressed need exists to provide devices, systems, and methods to allow the calling party to manipulate what the called party hears during what is otherwise termed the call alert cycle.

SUMMARY OF THE INVENTION

The above identified problem is solved by devices, systems, and methods that send an alert to a called party communications device during a call setup phase and present the alert to a called party during an alert portion of the call setup phase. Other devices, systems, and methods are provided that allow a calling party to remotely and securely access at least one host computer by sending a security phrase during a call setup phase and presenting the security phrase to the host computer to determine if, by way of comparison to a voice print, the calling party is a valid user.

With regard to one exemplary embodiment, in order for the calling party to control the type of alert the called party hears when the calling party calls, a calling party communications device that includes a transceiver, a processor, and a memory can be utilized. The memory can include a messaging application that is configured to make the processor operable to provide a service to a user of the calling party communications device. The service can allow the user to send an alert to a called party communications device during a call setup phase and present the alert to a called party during an alert portion of the call setup phase.

In some embodiments, the alert may be selectable via a menu system provided on a display of the calling party communication device. Moreover, the alert may be created and/or customizable by the calling party. The alert may include a tone and/or a message, wherein the message may include at least one of a text-based message, a graphic-based message, a sound-based message, a video-based message, and the like.

An alert tone may be, for example, a ringtone such as a monophonic ringtone, a polyphonic ringtone, or a music ringtone.

In other embodiments, one or more alerts may be pre-installed in the memory, for example, by the manufacturer and/or a vendor of the calling party's communication device. Alternatively or in addition, one or more alerts may be downloadable from, for example, the Internet, an intranet, a kiosk, and/or a computer-readable memory such as a hard disk, a compact disk, a flash memory, and the like.

An exemplary embodiment of a system according to the present invention provides a calling party communications device that can be configured to receive an input, wherein the input is used to identify a called party to whom a calling party wants to send an alert. The calling party communications device can be further configured to receive a selection of one or more alerts and to send the alert(s) to the called party communications device during the call setup phase. The called party communications device can be configured to receive the one or more alerts and present the alert(s) to the indicated recipient during an alert portion of the call setup phase.

An exemplary method for communicating alerts between communications devices is also provided. The method includes a first step of receiving an input on a calling party communications device, wherein the input is used to identify a called party to whom a calling party wants to send one or more alerts. After a recipient is chosen, the calling party can select one or more alerts to send during the call setup phase. The selected alert(s) are then sent to the called party communications device during an alert portion of the call setup phase.

The exemplary method may further include the step of querying the called party communications device to determine if the called party communications device is capable and willing to receive the alert(s). The called party communications device can be configured to store an availability status information and/or whitelist/blacklist information to aid in this determination.

The exemplary method may still further include the step of querying a database to determine if the called party communications device is capable of receiving the alert(s). The database can be configured to store an availability status information and/or whitelist/blacklist information to aid in this determination.

Other embodiments of devices, systems, and methods are provided for communications between a device operating on a circuit-switched network and a packet-switched network. For example, a calling party communications device that is operating on a circuit-switched network may send an alert to a called party communications device that is operating on a packet-switched network via a service node. The calling party communications device may then include a processor, a memory, and a transceiver. The transceiver may be operable to enable communication between a calling party communications device and the service node. The service node can be configured to receive a number input from the calling party communications device that is addressable to a called party. The service node can be further configured to allow the calling party to select one or more alerts to send to the called party communications device during a call setup phase and to present the alert(s) to the called party during an alert portion of the call setup phase. The service node can still further be configured to present a menu system to the calling party, wherein the menu system provides a number of selectable alerts to the calling party.

In one embodiment, the alert may be created and/or customizable by the calling party. The alert may include a tone and/or a message, wherein the message may include at least one of a text-based message, a graphic-based message, a sound-based message, a video-based message, and the like. An alert tone may be, for example, a ringtone such as a monophonic ringtone, a polyphonic ringtone, or a music ringtone.

In other embodiments, one or more alerts may be pre-installed in the memory, for example, by the manufacturer and/or a vendor of the calling party's communication device. Alternatively or in addition, one or more alerts may be downloadable from, for example, the Internet, an intranet, a kiosk, and/or a computer-readable memory such as a hard disk, a compact disk, a flash memory, and the like.

An exemplary embodiment of a system for communicating between a communications device on a circuit-switched network and a communications device on a packet-switched network provides a calling party communications device that may be configured to receive an input, the input being used to establish communication with a service node. The calling party communications device may be further configured to receive a prompt from the service node and a response to the prompt. The response can include a called party telephone number and an alert. The calling party communications device may still further be configured to send the response to the service node.

In some embodiments, the service node can be configured to receive the response from the calling party communications device and send the alert(s) to a called party communications device during a call setup phase. The called party communications device can be configured to receive the alert(s) and present the alert to a called party during an alert portion of the call setup phase.

An exemplary method corresponding to the use of the immediately above-described system can include a first step of receiving a telephone number as an input on the calling party communications device. The telephone number may be addressable to a service node. The calling party communications device may then establish communication with the service node. The service node may then prompt the calling party to select one or more alerts and subsequently receive the calling party's selection. The alert(s) are then transmitted to the called party communications device.

In further embodiments, systems are provided that include at least one host computer and at least one calling party device. The host computer and the calling party device are configured to receive a security phrase. The host computer is further configured to acquire a voice print of at least one calling party associated with the at least one calling party device. The voice print can be comparable to the security phrase as presenting to the host computer. The host computer can be further configured to use the voice print and security phrase to determine if the calling party is a valid user of the host computer.

Some embodiments of this system may further include at least one additional security layer that is implemented after the calling party is granted access to the host computer. The system may also implement at least one preventative measure if the calling party is denied access to the host computer.

Methods for providing secure access via the exemplary system described above are also provided. An embodiment of such a method can include the steps of disclosing a security phrase to a host computer and to a calling party. Acquiring a voice print of the calling party, the calling party then requesting access to the host computer. Sending the security phrase to the host computer during a call setup phase and presenting the security phrase to the host computer during an alert portion of the call setup phase. Alternatively, the method may send the security phrase to the host computer prior to the alert portion of the call setup phase.

Further embodiments of this method may include the step of comparing the security phrase with the voice print and determining if the calling party is a valid user of the host computer. If it is determined that the calling party is a valid user of the host computer then the calling party is granted access. If not, the calling party is denied access.

Still further embodiments may include the step of implementing at least one additional security layer and/or at least one preventative measure based upon the above determination.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
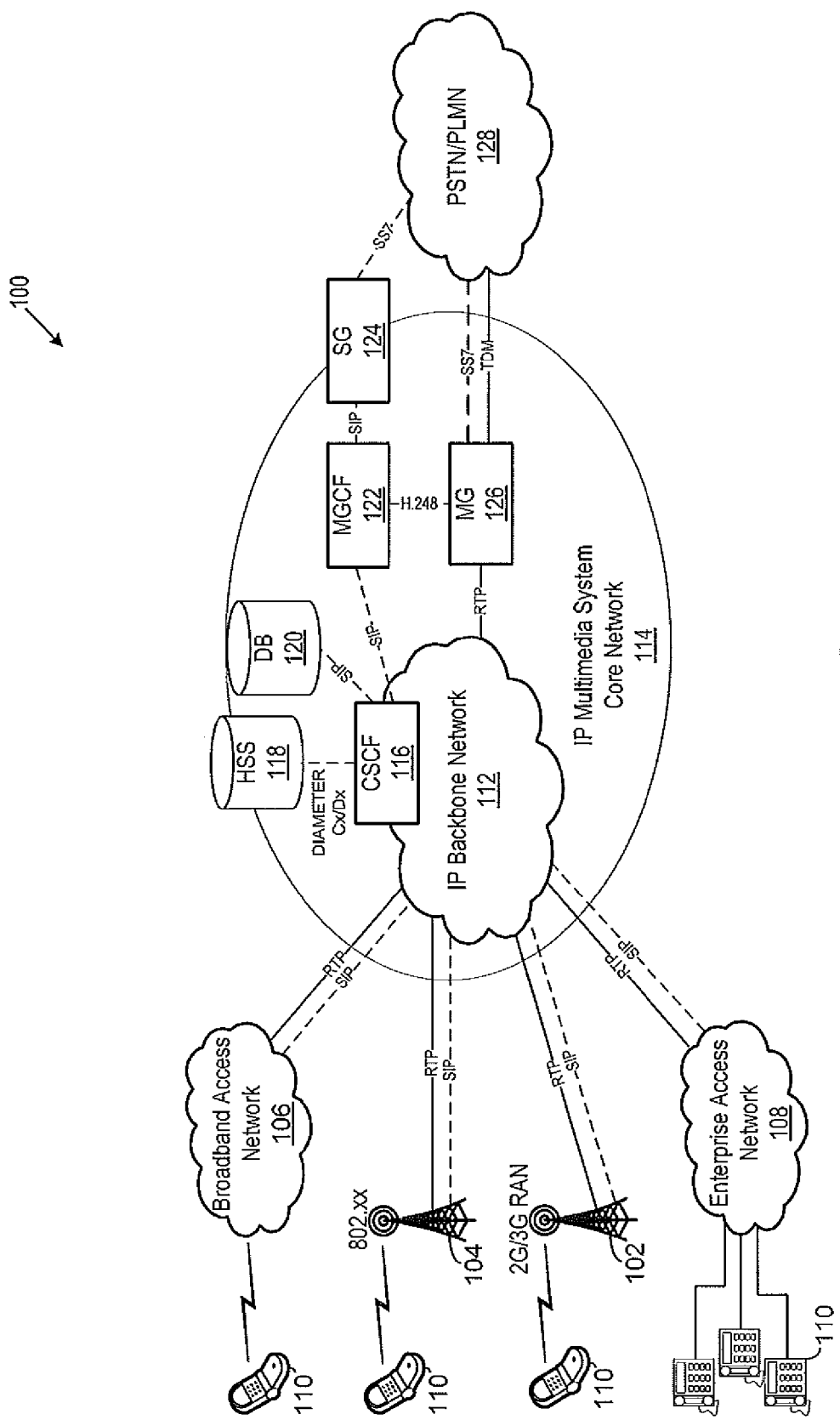
FIG. 1 illustrates a communications system in accordance with an embodiment of the present invention.

Referring now to the drawings in which like numerals represent like elements throughout the several views, FIG. 1 illustrates an exemplary communications system 100, according to the present invention. The illustrated communications system 100 includes a number of access networks, namely a 2G/3G radio access network (RAN) 102, an IEEE 802.xx access network 104, a broadband access network 106, and an enterprise access network 108.

The means for wireless communication used by the 2G/3G RAN 102 can include, but is not limited to, Time Division Multiple Access (TDMA), Global System for Mobile Communications (GSM), General Packet Radio Service (GPRS), Enhance Data GSM Environment (EDGE), Code Division Multiple Access (CDMA), Wideband CDMA/Universal Mobile Telecommunications System (W-CDMA/UMTS), CDMA2000, any variations and combinations thereof, and the like. The IEEE 802.xx access network 104 can utilize any 802.xx standard and variations or combinations thereof. The broadband access network 106 can utilize cable, Digital Subscriber Line (DSL), satellite, fiber optic, and the like. The enterprise access network 108 can comprise a number of IP-compatible telephones in communication with, for example, an IP Private Branch Exchange (IP PBX).

The illustrated communications system 100 further includes user equipment (UE) 110 that is in communication with any of the access networks. The UE 110 can include, but is not limited to, handheld devices such as an information appliance, a smartphone, a personal digital assistant (PDA), a mobile phone, a personal communicator, and/or a handheld game console; other mobile devices such as laptop computers; stationary devices such as desktop computers, servers, and the like; and various other telephony devices. It is contemplated that the present invention may be extended to any number of the above-mentioned devices; however, for simplicity and to aid in teaching the present invention, the term user equipment (UE) as used hereinafter will refer to a mobile device that is in communication with the 2G/3G RAN. This, however, does not limit the scope of the present invention to just a mobile device, rather it is provided as an exemplary embodiment for which one of ordinary skill in the art may practice the present invention.

Each of the above-described access networks 102, 104, 106, 108 provide access to an IP network 112. The IP network 112 is the backbone of the IP multimedia subsystem (IMS) 114. In IMS 114, signaling channels are represented by dashed lines and utilize Session Initiation Protocol (SIP). Further, Real-time Transfer Protocol (RTP) is illustrated by solid lines as the transfer/transport protocol used by IMS 114.

The IP backbone network 112 can include a Call State Control Function (CSCF) 116 as is known to those skilled in the art. The CSCF 116 may include one or more components such as a proxy-CSCF, an interrogating-CSCF, or a serving-CSCF. These components provide functionality for IMS 114 as is known to those skilled in the art. The CSCF 116 is in communication with a Home Subscriber Server (HSS) 118 through a DIAMETER signaling channel. The HSS 118 is a database configured to store subscriber information, call information, security information, location information, and other information pertinent to the network and its subscribers. Additional data stores (not shown) may be in communication with the HSS 118.

The CSCF 116 may also be in communication with a database 120. The database 120 can be used to store, for example, subscriber profile information not found in the HSS 118. Alternatively, the functionality of the database 120 may be integrated into the HSS 118. The database 120, its contents, and its functionality will be discussed in greater detail with reference to FIG. 4.

The CSCF 116 may also be in communication with a Media Gateway Control Function (MGCF) 122, which in turn is in communication with a Signaling Gateway (SG) 124 and a Multimedia Gateway (MG) 126. The SG 124 as is known to those skilled in the art, converts SIP signaling messages to Signaling System Number 7 (SS7) signaling messages and provides a signaling gateway to the Public Switched Telephone Network (PSTN) and the Public Land Mobile Network (PLMN) 128, collectively. The MG 126 receives RTP traffic from the IP backbone network 112 and is controlled by the MGCF 122 via H.248 control protocol. The MG 126 converts RTP channels to Time Division Multiplexing (TDM) channels and thus provides a traffic gateway to the PSTN/PLMN 128.

The protocols illustrated in FIG. 1 and referenced herein are provided as exemplary protocols for use in implementing the present invention. It is contemplated, however, that additional and/or alternative protocols may be used as deemed appropriate by one of ordinary skill in the art to practice the present invention.

Figure 2:
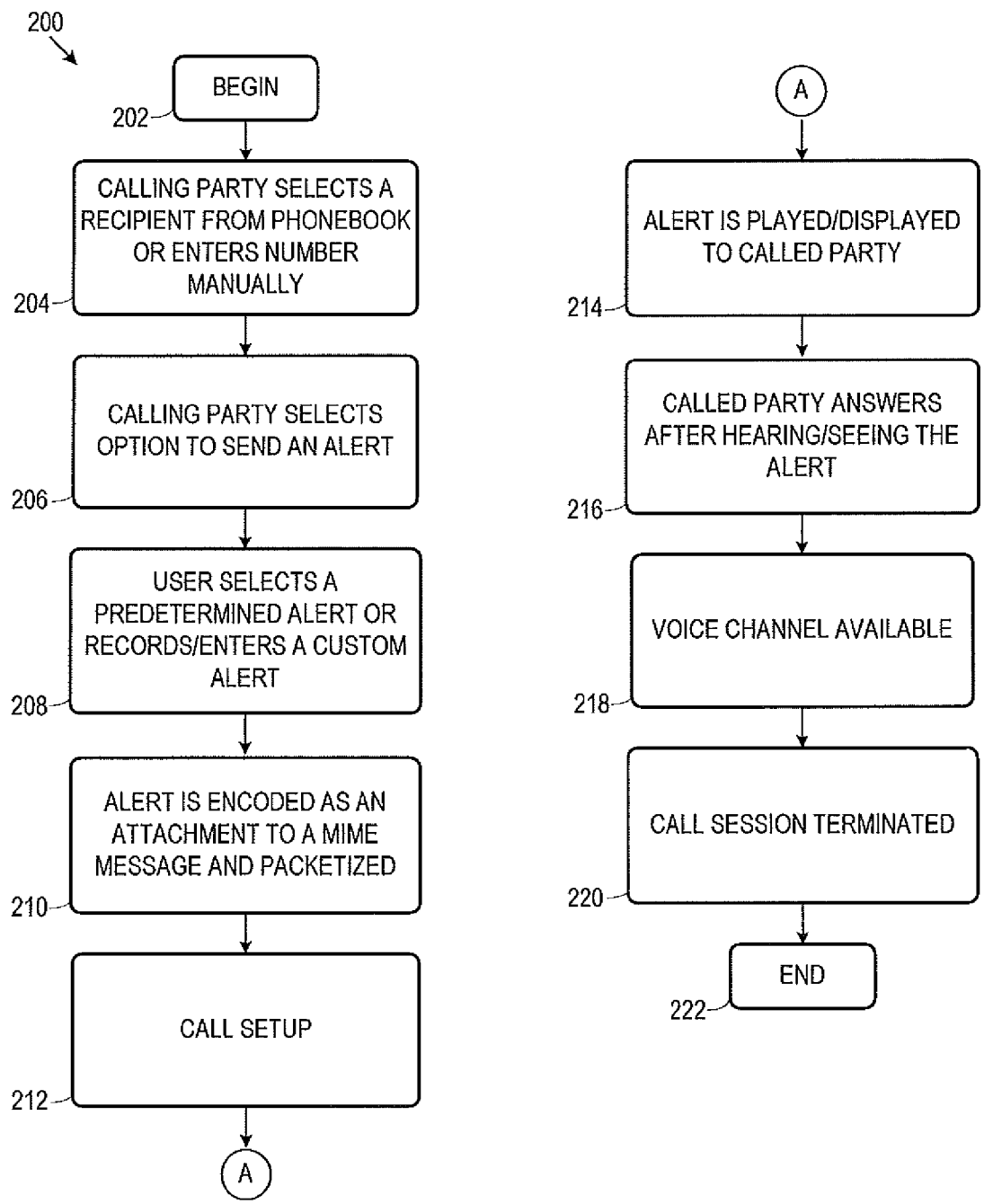
FIG. 2 illustrates a flow chart of an exemplary method for sending an alert from a calling party device to a called party device, according to the present invention.

Referring now to FIG. 2, a flow chart of an exemplary method 200 for sending a message from an IMS-compatible device to another IMS-compatible device via communications system 100 is illustrated, according to the present invention. It should be understood that the steps described herein with reference to FIG. 2 are not limited to the order shown.

The exemplary method 200 begins at step 202 and proceeds to step 204, wherein a calling party can identify a recipient. The calling party may identify the recipient by manually entering a telephone number or selecting a recipient from a contact list, an address book, a phone book, and/or the like. After the calling party identifies the recipient, the exemplary method 200 proceeds to step 206, wherein the calling party selects an option to send an alert to the called party during the call alert cycle. Here, an alert includes a tone and/or a message.

A tone, as defined herein, refers to ringtones of any type such as, but not limited to, a monophonic ringtone, a polyphonic ringtone, or a music ringtone, any of which may be selected from a menu system on the calling party's device and/or may be customized by the calling party. It is contemplated that a number of tones can be made available to the calling party via conventional means such as pre-installed on the device or downloadable to a memory of the device. The memory can be, for example, an internal memory such as a Subscriber Identity Module (SIM) or other read-only memory (ROM), random access memory (RAM) or a combination thereof. Further, the memory can be internal, external, and/or removable.

A message, as defined herein, refers to any type of message such as, but not limited to, a text-based message, a graphic-based message, a sound-based message, a video-based message, or any combination thereof. A message may be selected from a menu system on the calling party and/or may be customized by the calling party.

The text-based message can be, for example, a pre-defined text-based message that is selectable via a menu system on the calling party's device. Moreover, these messages can be pre-installed on the device or downloadable to a memory of the device. Text-based messages may also be customizable to include one or more telephone numbers, fax numbers, email addresses, home addresses, business addresses, and other contact information such as information typically sent in a vCard. It is contemplated that this information can be populated by the user through methods such as, but not limited to, manual entry on a keypad of the device, automatically populated by contact information stored in a memory of the device, or downloaded from a host network or network node that is configured to store such information. In alternative embodiments, a text-based message may be formatted and/or coded such that the message is more visually appealing to the message recipient.

An example sound-based message is a voice message. The voice message can be, for example, a pre-recorded voice message that is selectable via a menu system on the calling party's device. These pre-recorded voice messages can be pre-installed on the device or downloadable to a memory of the device. Moreover, the voice message may be generated by the calling party via the use of device components, such as a microphone and recording software. The custom voice message may be recorded locally on the calling party's device. Alternatively, the custom voice message may be recorded on a separate device, such as a service node that is configured with recording functionality.

The graphic-based and video-based message may also be pre-defined messages that can be pre-installed on the device or downloadable to a memory of the device. Alternatively, these messages may be customizable by the calling party.

By way of example and not limitation, some embodiments provided herein utilize a text-based message to send the calling party's contact information. By further example, other embodiments provided herein utilize a sound-based message in the form of an alerting tone or a voice message. These embodiments afford the called party the ability to be presented with the contact information of the calling party, a calling party alert tone, or a voice message from the calling party during the alert cycle and prior to answering the call. A tone and/or message may be sent singly or may be accompanied by one or more other tones and/or messages.

After the calling party selects the option to send an alert to the selected recipient, the exemplary method 200 proceeds to step 208. At step 208, the calling party can be provided the option to select one or more tones and/or messages from a menu system, or alternatively, the calling party can generate a customized tone and/or message by any of the methods previously described. Alternatively, the alerting message can be loaded from, for example, a removably insertable memory. In this case, the alerting message can be created and/or modified by a device or system other than the calling party's device. The calling party, for example, may have a computer that is configured to store an application. This application may allow the calling party to create, modify, or otherwise manipulate the contents of the tone and/or message. The tones and/or messages that the calling party determines will be used frequently may be sent to the device and may be stored and made selectable via a menu system. These may be updated automatically by the device or updated manually by the calling party.

After the calling party selects and/or prepares the alert, the exemplary method 200 proceeds to step 210. At step 210, the alert data can be used to create, for example, a Multipurpose Internet Mail Extensions (MIME) message. The MIME message can include the appropriate primary and secondary headers to incorporate the different media types associated with the alerting message such that the MIME message is readable by the called party device. The MIME message is encoded and packetized in step 210.

At step 212, a call setup phase is initiated upon the calling party pressing a send or similar key on the sending device. The call setup phase and data transfer phase of the communications exchange is described in further detail with reference to FIG. 3.

At step 214, the alert is presented to the called party during the alert cycle. As previously mentioned, a combination of tones and messages may be utilized. In this case, for example, a voice message may be presented to the called party as well as a text for contact information. The contact information may have the functionality to be saved to the called party's contact list. In some embodiments, options may be provided to the calling party to configure settings for the type of alert and the alert content for individual recipients and/or groups of recipients. These settings may also be customizable and/or user created. Further, on the recipient's end, settings may be provided to accept, decline, or otherwise control the types and the methods the different alerts may be presented to the called party.

At step 216, the called party answers the call after hearing and/or seeing the alert. After answering, a voice channel is made available at step 218. The call session is terminated at step 220. The exemplary method 200 ends at step 222.

Figure 3:
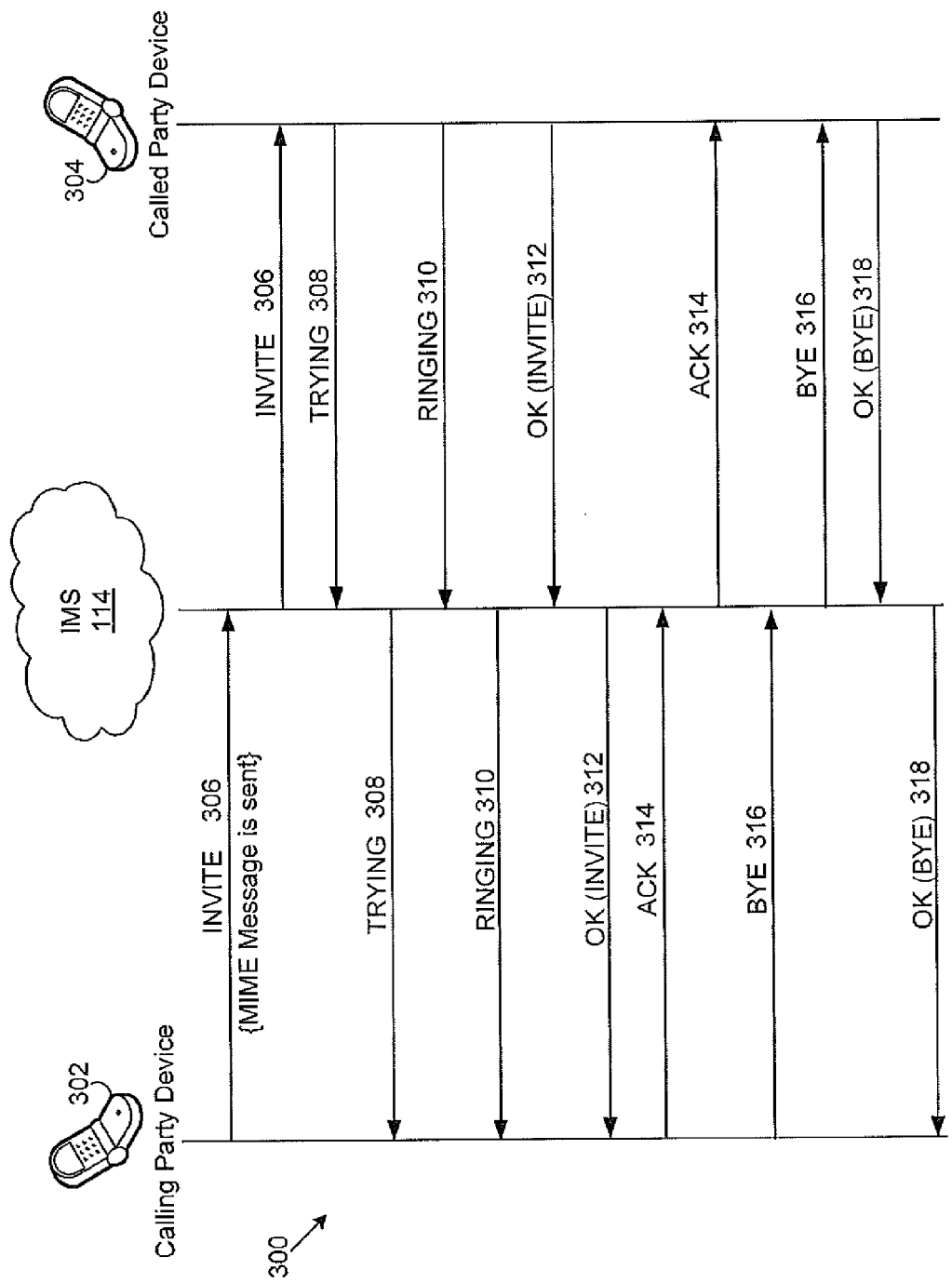
FIG. 3 illustrates a call flow diagram of an exemplary call flow for sending an alert from a calling party device to a called party device, according to the present invention.

Referring now to FIG. 3, an exemplary call flow diagram 300 for a call between an IMS-compatible calling party device 302 and an IMS-compatible called party device 304 is shown, according to the present invention. The illustrated call flow 300 utilizes Session Initiation Protocol (SIP) as the signaling protocol; however, other signaling protocols such as H.323 may also be used. Further, the transport protocol used may be Transfer Control Protocol (TCP) or User Datagram Protocol (UDP), Real-time Transfer Protocol (RTP), or RTP Control Protocol (RTPCP). The network protocol may be Internet Protocol version 4 (IPv4) or Internet Protocol version 6 (IPv6). Protocols other than those mentioned above may also be used to perform the exact functions or substantially similar functions as described herein with regard to the present invention such as ISDN protocols. Further, it should be understood that the message described with reference to FIG. 3 and with later reference to additional figures is a MIME message; however, alternative formats capable of producing a substantially similar result that is congruent with the scope of the present invention may also be used and are contemplated.

The exemplary call flow diagram 300 illustrates a calling party device 302 and a called party device 304 that are both in communication with the IMS 114 via one of the previously described access networks 102, 104, 106, 108. The call flow diagram 300 begins during step 212 of FIG. 2 with an INVITE message 306 being sent to the IMS 114. In a traditional SIP call setup phase, an INVITE message indicates a user or service is being invited to participate in a call session. In the present invention, however, a MIME message that includes the tone(s) and/or message(s) is appended to the INVITE message 306. The IMS 114 receives the INVITE message 306 and forwards the message to the called party device 304. The called party UE 304 receives the INVITE message 306 and responds by sending a TRYING message 308 back to the IMS 114 to acknowledge the receipt of the INVITE message 306. The IMS 114, in turn, forwards the TRYING message 308 to the calling party device 302.

The called party device 304 sends a RINGING message 310 to the IMS 114. The IMS 114, in turn, forwards the RINGING message 310 to the calling party device 302. It is during the RINGING message 310 that the MIME message attachments in the form of any tone(s) and/or messages(s) are presented to the user via the appropriate means. For example, a music tone may be playing during this time. Alternatively or in addition, a voice message may be played. Other attached messages are also contemplated as previously described.

Upon the called party answering the device 304, an OK (INVITE) message 312 is sent to the IMS 114 and forwarded to the calling party device 302.

In response to the OK (INVITE) message 312, the calling party device 302 can send an ACK message 314 to the IMS 114 to acknowledge the receipt of the OK (INVITE) message 312. The IMS 114, in turn, can send the ACK message 314 to the called party device 304. The receipt at the called party device 304 of the ACK message 314 confirms the communication between both the calling party device 302 and the called party device 304 and a data/voice session may be initiated.

Either party may end the call. As illustrated, the calling party device 302 is the terminating device. As such, it sends a BYE message 316 to the IMS 114. The IMS 114 forwards the BYE message 316 to the called party device 304. In response, the called party device 304 (i.e., the terminated device) sends an OK (BYE) message 318 and the call is terminated.

In alternative embodiments, a database 120 may be utilized to provide availability status and whitelist/blacklist information to the calling party device 302. An exemplary call flow diagram 400 that utilizes the database 120 is provided and will now be discussed with reference to FIG. 4.

The illustrated call flow diagram 400 includes all of the elements shown in FIG. 3 with the addition of a database 120. The database 120 can be configured to store subscriber profile information for each subscriber such as, but not limited to, aliases, ENUM numbers, call control information, presence settings, and/or whitelist/blacklist settings. The database 120 can be, for example, an analytic database, an operational database, a hierarchical database, a network database, or any combination thereof. Further, the database 120 may be in communication with and/or stored within a memory of one or more nodes, for example, a server. Further still, the database 120 may be integral to the IMS 114 or may be in communication with one or more nodes within the IMS 114 such as the HSS 118, for example. Alternatively or in addition, the database 120 may have at least one input that is configured to receive pertinent data.

The call flow as illustrated in call flow diagram 400 differs from the call flow diagram 300 with respect to the new elements. In addition to the SIP messages described with reference to FIG. 3, the presently illustrated embodiment employs two additional messages, a profile query 402 and a query response 404. The profile query 402 is utilized by the IMS 114 to determine if the calling party device 302 is capable of receiving an alert and optionally if the calling party has established any restrictive settings for access to the called party device 304 via any method of the present invention. These settings can include, for example, presence settings such as available, not available, busy, do not disturb, and other availability statuses known to those skilled in the art.

Presence settings may be used to automatically limit the ability of the calling party device 302 to send a tone and/or message to the called party device 304. For example, if the called party is in a meeting or otherwise in a situation wherein the called party would typically select a vibrate setting, a silent setting, or a similar setting for the device 304, the called party device 304 may send an indication of this new status to the database 120.

Consequently, when the calling party device 302 sends an INVITE message 306 to the IMS 114, the IMS 114 can send a profile query 402 to the database 120. The profile query 402 can be used to determine if the called party device 304 is currently available to receive an alert and if so, which type of alert. This can be determined by availability status and/or whitelist/blacklist information stored in database 120. Further, the availability status may be based upon presence information acquired from the called party device 304. This availability status may have been manually indicated by the called party or automatically updated based upon one or more feedback parameters received by the called party device 304.

After the database 120 determines the status of the called party device 304, a query response 404 may be sent back to the IMS 114. The database 120 may provide instructions to delete the MIME message in the INVITE message 306, for example, if the called party's profile indicates that the called party device 304 is unable to accept a calling party provided alert or if the called party has enabled a setting to prevent such an alert from being sent to the called party device 304. The query response 404 can include the availability status, which the IMS 114 may use to send a notification to the calling party device 302 regarding the current capabilities of the called party device 304. The notification may include any type of message such as, but not limited to, an audible message sent during the ring back tone or a text-based message displayed on a display of the calling party device 302 to notify the calling party that their tone and/or message will not be received in the original form. Moreover, this notification may present at least one option to the calling party to, for example, select another communication method, convert the present tone and/or message to one suitable for the current status of the called party, and/or terminate the call.

In alternative embodiments, the availability status and whitelist/blacklist could be stored at the called party device 304. As such, the called party device 304 could send instructions, for example, in the TRYING message 308 so as to inform the calling party device 302 that the alert will not be accepted, at least in its present form, by the called party device 304. These instructions may be sent based upon settings in the called party device 304.

The previous embodiments described features of the present invention that utilized a calling party device 302 and a called party device 304, both of which are capable of communicating via the IMS 114. Alternative embodiments are provided below that enable a device that is not compatible with IMS 114, such as device 504 as shown in FIG. 5 to communicate with an IMS-compatible device embodied by UE 110.

Figure 5:
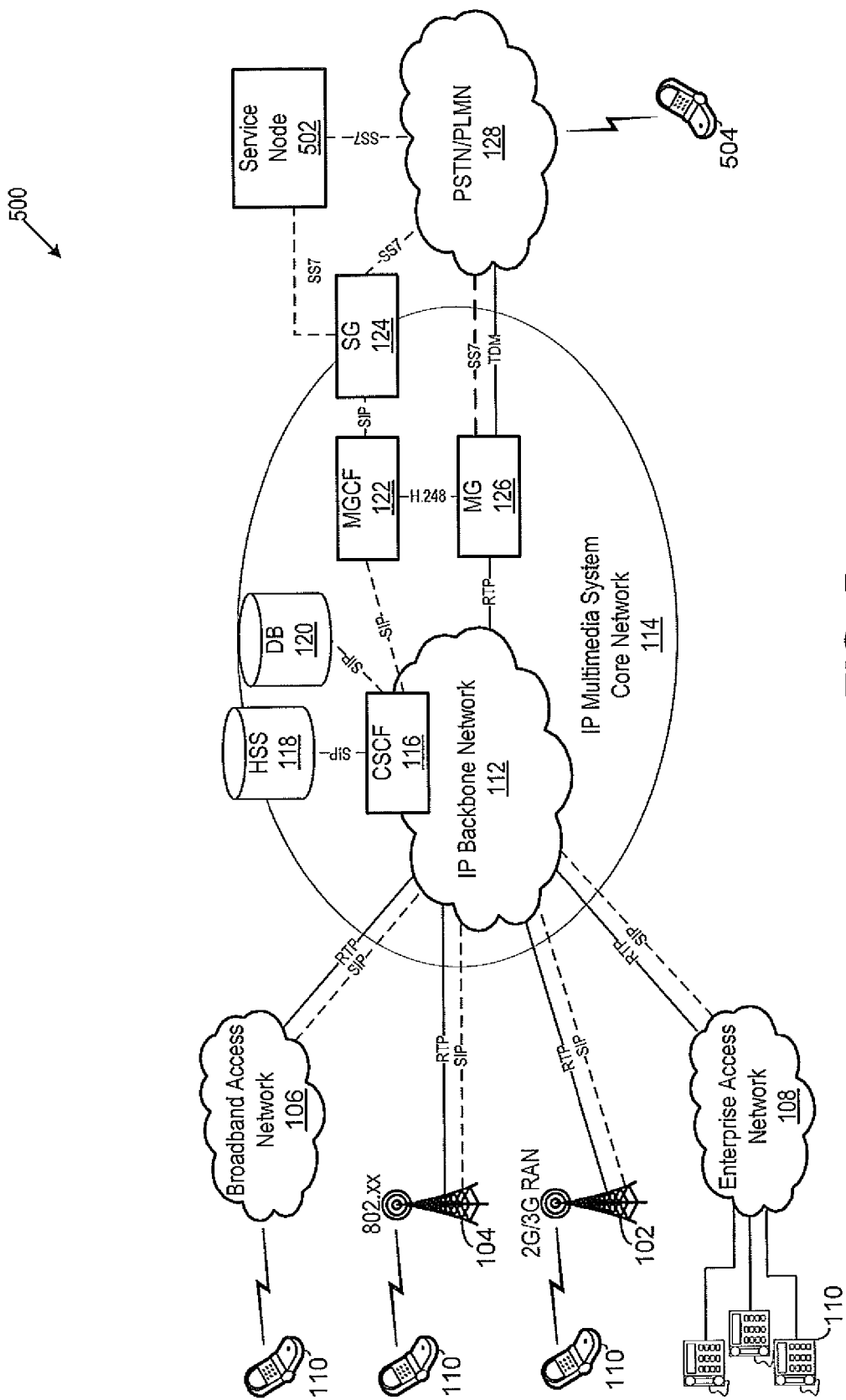
FIG. 5 illustrates the communications system of FIG. 1 with the addition of a service node, according to the present invention.

FIG. 5 illustrates a communications system 500, according to the present invention. The illustrated communications system 500 includes all of the elements as shown in communications system 100 of FIG. 1, plus a service node 502, and the calling party device 504. As illustrated, the calling party device 504 is in communication with the PLMN 128. The PLMN 128 is in communication with the service node 502, which in turn is in communication with the SG 124. The service node 502 is configured to bridge calls from the PSTN/PLMN 128 to an IMS-compatible device such as UE 110. The service node 502 is also configured to provide similar functionality to that of an IMS compatible device. That is, the service node provides IMS signaling capability to enable communication between the incompatible device 504 and the IMS network 114. An exemplary call flow for such a communication scheme is provided in FIG. 6.

Figure 6:
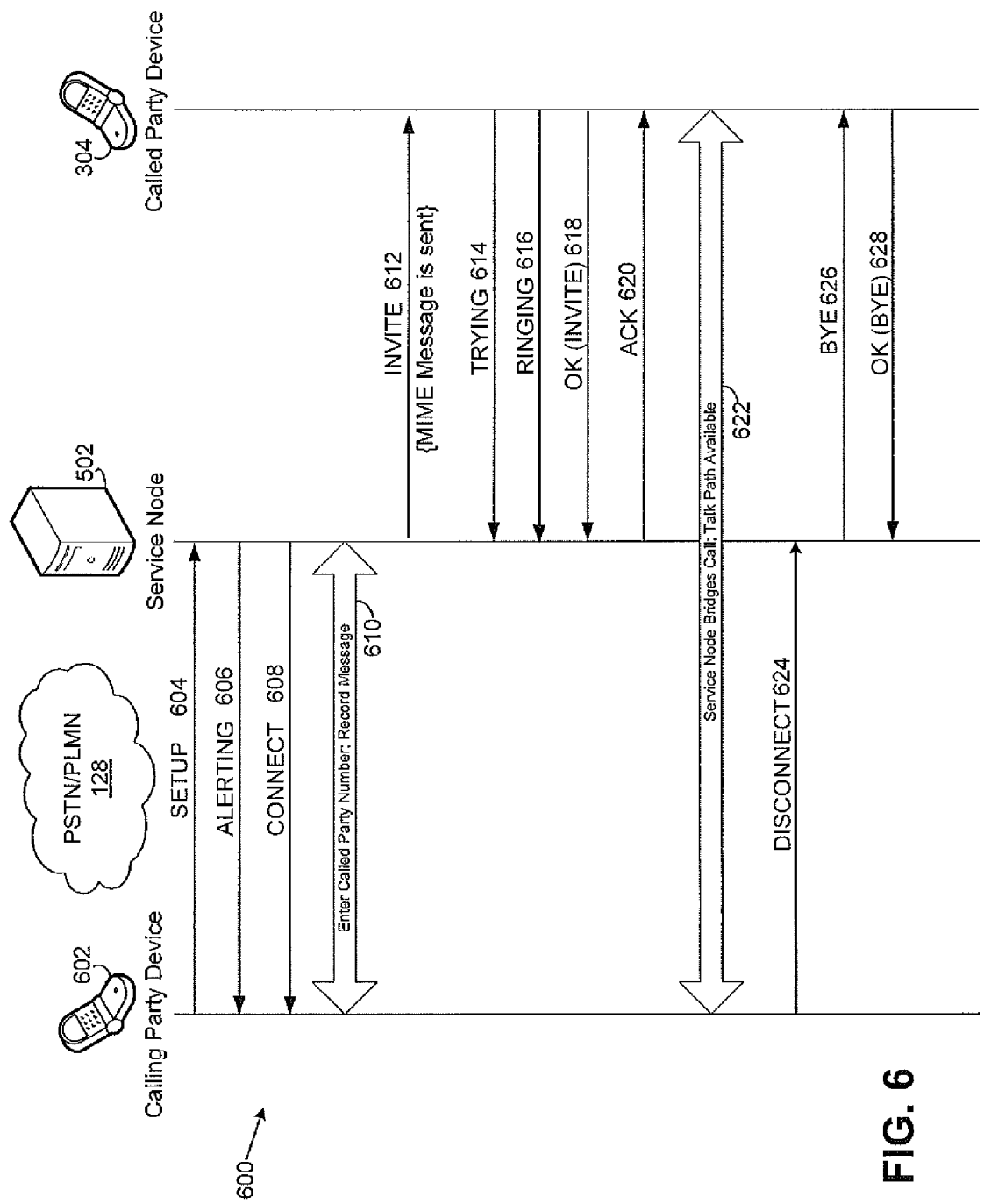
FIG. 6 illustrates a call flow diagram of an exemplary call flow for sending a message between devices, according to the present invention.

Referring now to FIG. 6, an exemplary call flow diagram 600 for a call between an IMS-incompatible calling party device 602 and an IMS-compatible called party device 304 is shown, according to the present invention. The illustrated call flow diagram 600 includes a calling party device 602, the PSTN/PLMN 128, a service node 502, and a called party device 304.

The illustrated call flow diagram 600 begins with the calling party device 602 sending a SETUP message 604 via the PLMN 128 to the service node 502. The SETUP message 604 is used to setup a communication channel between the calling party device 602 and the service node 502. The SETUP message 604 can be sent upon the calling party dialing a number corresponding to the service node 502. In response, the service node 502 can send an alerting message 606 to notify the calling party device 602 that the SETUP message 604 has been received. Shortly thereafter, a CONNECT message 608 can be sent from the service node 502 to the calling party device 602 to notify the calling party device 602 of a connection. This may be accompanied by a prompt for the calling party to select a tone and/or message, to create a custom tone and/or message, and to select or enter the number of the desired party. This exchange 610 may be presented to the calling party device 602 via, for example, a synthesized voice recording. Voice recognition may also be implemented to aid in operation of these functions.

After the called party enters, selects, or otherwise indicates the called party number and the desired alert types, the service node 502 can send an INVITE message 612 to the called party device 304. The INVITE message 612 can include a MIME message with the alert as an attachment. The called party device 304 can respond to the INVITE message 612 with a TRYING message 614 to indicate to the service node 502 that the INVITE message 612 was received.

After the TRYING message 614, a RINGING message 616 can be sent from the called party device 304 to the service node 502. The MIME message attachments are presented to the called party 304 at this point.

In some embodiments, the calling party device 602 may receive feedback such as, but not limited to, an alert tone or alert message, to notify the calling party that the called party is being alerted. The feedback may be sent to the calling party device 602 after the RINGING message 616 is received at the service node 502.

An OK message 618 can be sent to the service node 502 in response to the called party after the called party device 304 registers in an off-hook state.

In response to the OK message 618, the service node 502 can send an ACK message 620 to the called party device 304 to acknowledge the receipt of the OK message 618. At this point, the service node 502 bridges the call and a talk path 622 becomes available.

At the end of the call (e.g., if terminated by the calling party device 602), a DISCONNECT message 624 can be sent to the service node 502 to request that the call be terminated. The service node 502, in turn, can send a BYE message 626 to the called party device 304 to terminate the call. The called party device 304 can respond to this message by sending an OK (BYE) message 628 to the service node 502. The call is then terminated.

Figure 4:
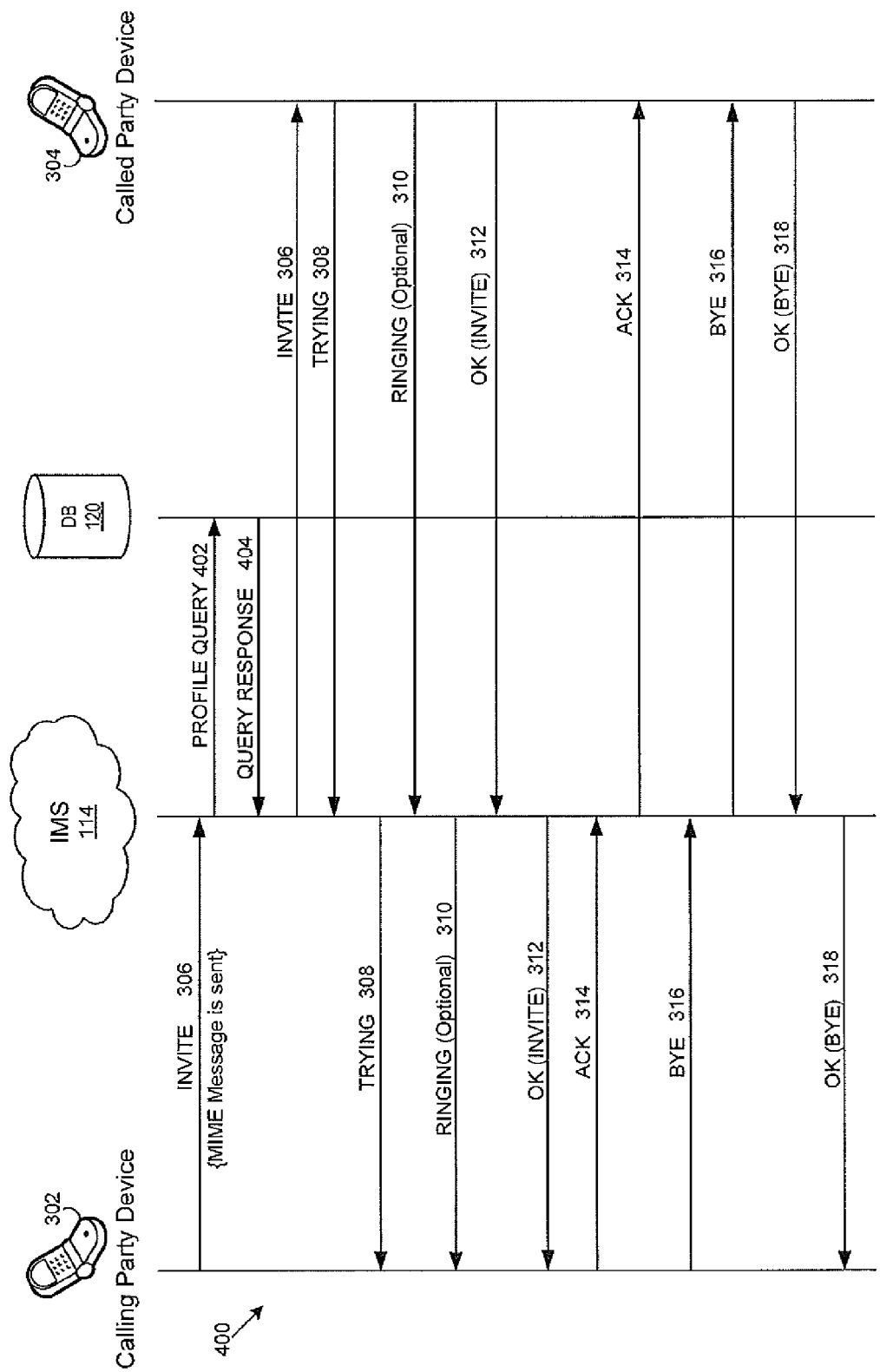
FIG. 4 illustrates a call flow diagram including a database query and query response, according to the present invention.

It is contemplated that a database such as database 120 may be used to provide similar functionality as described with reference to FIG. 4. The database 120 may be stored within the service node 502, stored within another node in communication with service node 502, or implemented as a separate entity.

Figure 7:
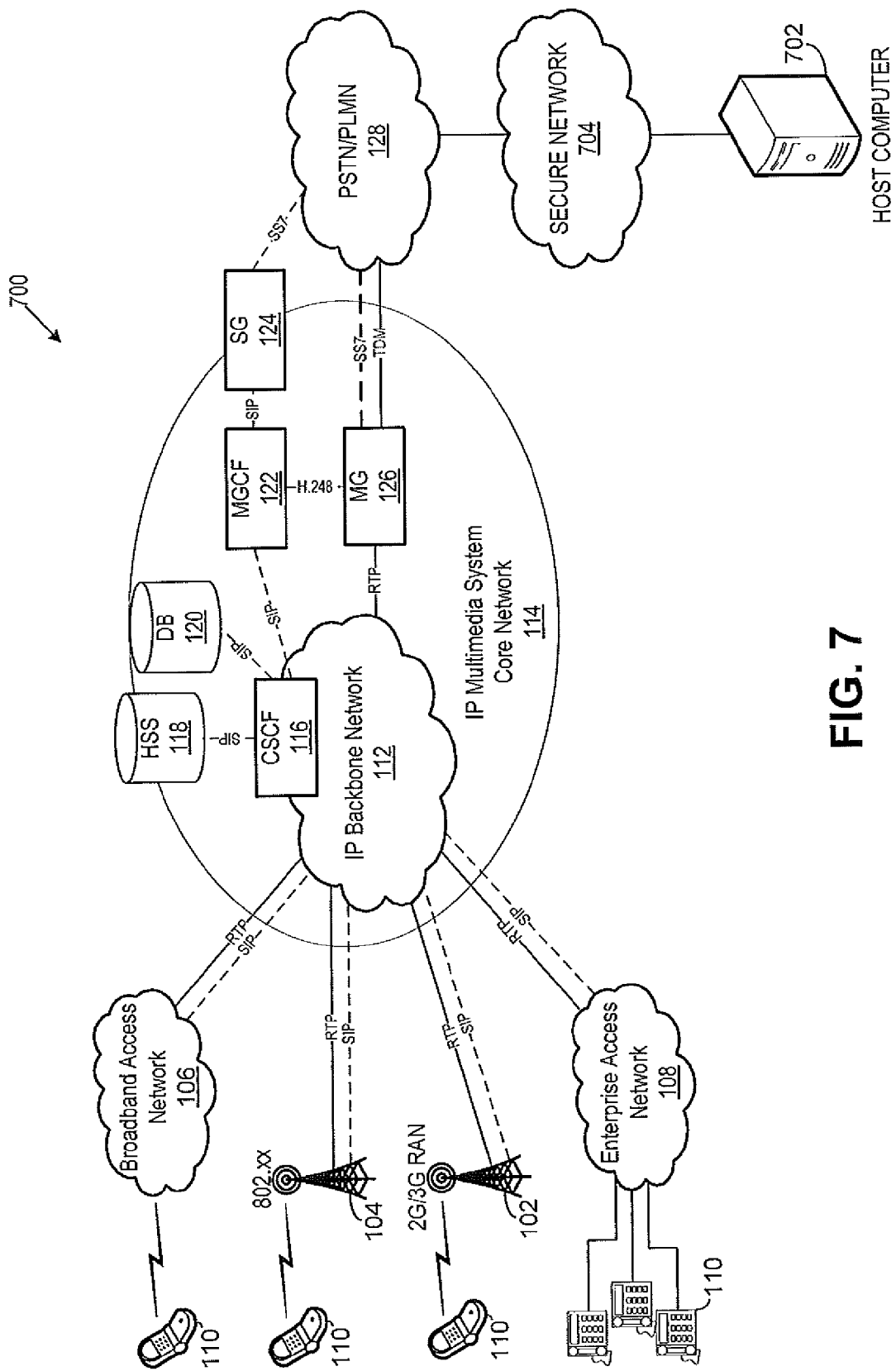
FIG. 7 illustrates the communications system of FIG. 1 with the addition of a host computer and supporting network, according to the present invention.

Referring now to FIG. 7, a communications system 700 for secure remote access via a calling party's device to a host computer is illustrated, according to the present invention. The illustrated communications system 700 includes all the elements illustrated in FIG. 1 with the addition of a host computer 702 and a secure network 704. The host computer 702 is in communication with the secure network 704, which in turn is in communication with the PSTN/PLMN 128.

Figure 8:
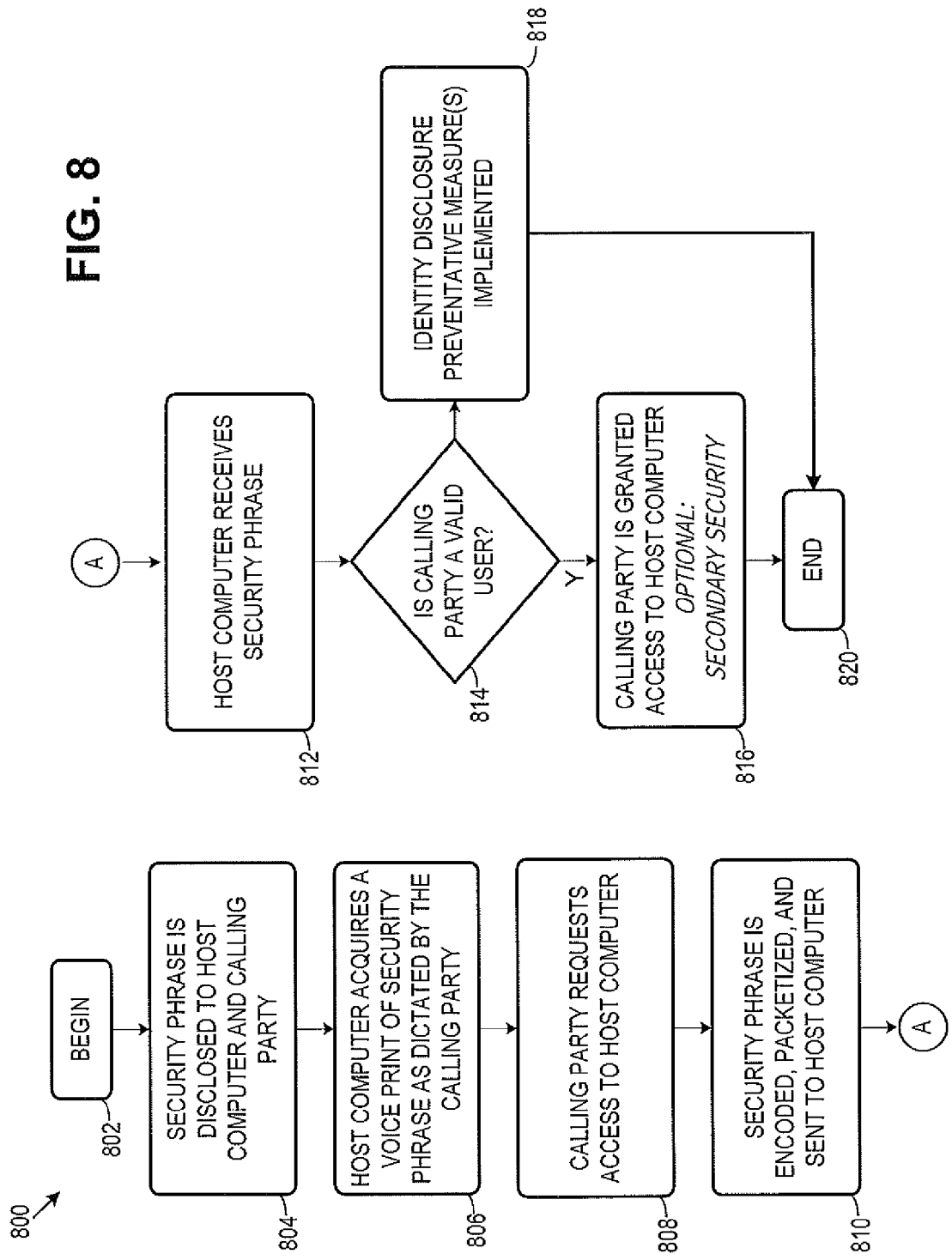
FIG. 8 illustrates a flow chart of an exemplary method for secure remote access to a host computer, according to the present invention.

The host computer 702 can be configured to store any information for which a party wishes to remain inaccessible to unauthorized parties. As such, the host computer 702 may be one of several computers in a network, such as secure network 704, of a business or government agency. The secure network 704 can comprise a variety of security layers to monitor and/or limit access to the host computer 702 including, but not limited to, those layers described herein in accordance with the present embodiment. An exemplary method 800 for controlling secure remote access by a calling party's device is described below with reference to FIG. 8.

The exemplary method 800 begins at step 802 and proceeds to step 804, wherein at least one security key is disclosed to the host computer 702 and to the calling party. The security key may comprise a security phrase that is later used by the host computer 702 to identify the calling party as a valid user. It is contemplated that the encryption and decryption algorithms used in association with the provided security keys may be any known to those skilled in the art that conform to provide the same or substantially similar features as provided by the present invention.

At step 804, the host computer 702 acquires a voice print of the calling party. The calling party, for example, may be required to recite one or more sentences so that the host computer 702 may acquire an appropriate sample to create an accurate voice print. In alternative embodiments, the host computer 702 may only require that the calling party recite the exact security phrase. In either case, voice recognition software and the appropriate hardware can be utilized by the host computer 702 or an entity in communication with the host computer 702 to acquire the data necessary to create the voice print.

After step 804, the exemplary method 800 proceeds to step 806, wherein the calling party requests access to the host computer 702. This request can be sent to the host computer 702 as, for example, a MIME message attachment. The security phrase is then encoded in the MIME message, packetized, and sent to the host computer 702 at step 808. The call flow associated with this method 800 is described in detail with reference to FIG. 9.

At step 810, the security phase is delivered to the host computer 702. At step 812, the host computer 702 receives the security phrase during the ringing cycle of the call placed to the host computer 702. Alternatively, the method may send the security phrase to the host computer 702 prior to the alert portion of the call setup phase.

The security phrase is then compared to the voice print. The comparison can compare the voice characteristics of the calling party to the voice characteristics established and recorded in the voice print and/or the comparison can compare the entire security phrase or a portion thereof to determine if the calling party is a valid user.

If, at step 814, it is determined that the calling party is a valid user, then the calling party is granted access to the host computer 702 at step 816. Optionally at this step, additional security layers may be implemented to further protect the data and data lines associated with the secure network 704 and the host computer 702.

If, however, it is determined at step 814 that the calling party is not a valid user, then the method proceeds to step 818, wherein preventative measures may be taken so as not to disclose the identity of the secure network 704, the host computer 702, other computers in communication with or within the secure network 704, and the associated data lines. The preventative measures used can be, for example, a continuous ring back to the invalid user's device, a network error message, and the like. After step 816 or step 818, the exemplary method 800 proceeds to step 820 and the method 800 ends.

Figure 9:
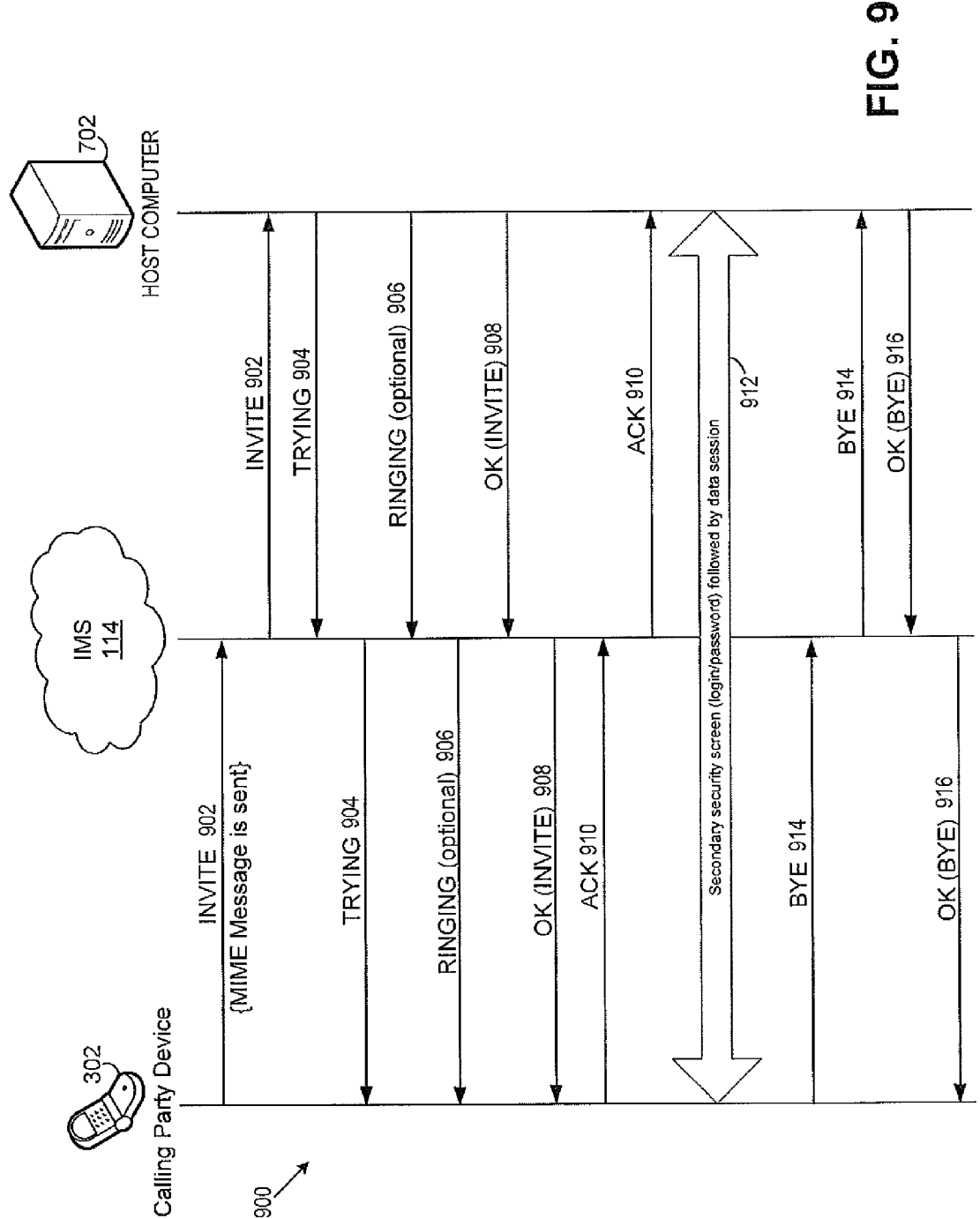
FIG. 9 illustrates a call flow diagram of an exemplary call flow for secure remote access to a host computer, according to the present invention.

Referring now to FIG. 9, an exemplary call flow diagram 900 for implementing the method 800 described immediately above is illustrated, according to the present invention. The illustrated call flow diagram 900 includes the calling party device 302, the IMS 114, and the host computer 702. The call flow diagram 900 includes elements described with reference to FIG. 3 and FIG. 4 and as such, only the new elements pertinent to the present embodiment are discussed.

It was mentioned previously that the security phrase is sent as an attachment in a MIME message. The MIME message is appended to the INVITE message 902. After the TRYING message 904 is sent by the host computer 702 in response to the INVITE message 902, an optional RINGING message 906 is sent to the IMS 114. During the RINGING message 906, the host computer 702 is presented with the security phrase sent in the MIME Message. The host computer 702 compares the received security phrase with the voice print by any of the above-described means and determines if the calling party is a valid or invalid user.

Upon validation a secondary security screen, for example, may prompt the user to enter login identification and a corresponding password into the appropriate entry fields. In addition or alternatively, other security mechanisms may be implemented.

The embodiments described herein have outlined several aspects of the present invention. In one embodiment, a ringtone may be sent to a called party's device during the alert cycle of an IP call. In other embodiments, a voice message may be sent during the alert cycle to provide a called party with, for example, an urgent message. Variations of these embodiments provide means for IMS-incompatible devices to communicate with IMS-compatible devices and to send a variety of information during the alert cycle. Further embodiments provide methods to utilize the present invention for secure remote access to computers.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A system, comprising:
    a processor; and
    a computer-readable storage device comprising computer-executable instructions that, when executed by the processor, cause the processor to perform operations comprising:
        obtaining a calling-party voice print associated with a calling party;
        receiving, from a calling-party device, a calling-party-provided security phrase encoded in a Multipurpose Internet Mail Extensions (MIME) message; and
        determining, during a time period associated with a ringing signal indicative of an incoming call and based on a comparison of the calling-party-provided security phrase to the calling-party voice print, whether the calling party is a valid user for the system.

2. The system of claim 1, wherein the operation of receiving the calling-party-provided security phrase is performed during an alert portion of a call-setup phase.

3. The system of claim 1, wherein the operation of receiving the calling-party-provided security phrase is performed prior to an alert portion of a call-setup phase.

4. The system of claim 1, wherein:
    the operations further comprise receiving a calling-party voice sample initiated at the calling-party device; and
    the operation of obtaining the calling-party voice print comprises generating the calling-party voice print using the calling-party voice sample.

5. The system of claim 1, wherein the operations further comprise:
    determining, after determining that the calling party is a valid user, whether the calling party passes an additional security layer; and
    granting, if it is determined that the calling party is a valid user and that the calling party passed the additional security layer, access for the calling party to the system.

6. The system of claim 1, wherein the operations further comprise:
    denying, in response to determining that the calling party is not a valid user, access for the calling party to the system; and
    implementing, in addition to denying access to the calling party, a preventative measure regarding the calling party and access to the system at least one preventative measure after the calling party is denied access to the system.

7. The system of claim 1, wherein the system is part of a called-party communication device.

8. The system of claim 1, wherein the operations further comprise comparing, in the comparison, the calling-party-provided security phrase to the calling-party voice print to determine whether the calling-party-provided security phrase matches the calling-party voice print.

9. The system of claim 1, wherein the operations further comprise receiving, from the calling-party device, a request to access the system.

10. The system of claim 9, wherein the calling-party voice print is a component of the request received.

11. A non-transitory computer-readable storage device comprising computer-executable instructions that, when executed by a processor, cause the processor to perform operations, at a system, comprising:
    obtaining a calling-party voice print associated with a calling party;
    receiving, from a calling-party device, a calling-party-provided security phrase encoded in a Multipurpose Internet Mail Extensions (MIME) message; and
    determining, during a time period associated with a ringing signal indicative of an incoming call and based on a comparison of the calling-party-provided security phrase to the calling-party voice print, whether the calling party is a valid user for the system.

12. The non-transitory computer-readable storage device of claim 11, wherein the operation of receiving the calling-party-provided security phrase is performed during an alert portion of a call-setup phase.

13. The non-transitory computer-readable storage device of claim 11, wherein the operation of receiving the calling-party-provided security phrase is performed prior to an alert portion of a call-setup phase.

14. The non-transitory computer-readable storage device of claim 11, wherein:
    the operations further comprise receiving a calling-party voice sample initiated at the calling-party device; and
    the operation of obtaining the calling-party voice print comprises generating the calling-party voice print using the calling-party voice sample.

15. The non-transitory computer-readable storage device of claim 11, wherein the system is part of a called-party communication device.

16. The non-transitory computer-readable storage device of claim 11, wherein the operations further comprise receiving, from the calling-party device, a request to access the system.

17. A method, comprising:
- obtaining, by a system comprising a processor, a calling-party voice print associated with a calling party;
- receiving, by the system, from a calling-party device, a calling-party-provided security phrase encoded in a Multipurpose Internet Mail Extensions (MIME) message; and
- determining, by the system, during a time period associated with a ringing signal indicative of an incoming call and based on a comparison of the calling-party-provided security phrase to the calling-party voice print, whether a calling party is a valid user for the system.

18. The method of claim 17, wherein receiving the calling-party-provided security phrase is performed during an alert portion of a call-setup phase.

19. The method of claim 17, wherein receiving the calling-party-provided security phrase is performed prior to an alert portion of a call-setup phase.

20. The method of claim 17, further comprising:
- receiving a calling-party voice sample initiated at the calling-party device; and
- obtaining the calling-party voice print further comprises generating the calling-party voice print using the calling-party voice sample.

* * * * *